United States Patent [19]

Krolik

[11] 3,946,313
[45] Mar. 23, 1976

[54] COMBINED ENCODER-DECODER APPARATUS HAVING A SINGLE ACTIVE FILTER

[75] Inventor: Kenneth J. Krolik, San Jose, Calif.
[73] Assignee: Motorola, Inc, Chicago, Ill.
[22] Filed: Oct. 15, 1974
[21] Appl. No.: 514,863

[52] U.S. Cl. .................................................. 325/18
[51] Int. Cl.² ........................................... H04B 1/40
[58] Field of Search ........................ 325/16, 18–22; 328/167

[56] References Cited
UNITED STATES PATENTS

| | | | |
|---|---|---|---|
| 3,250,997 | 5/1966 | Cole et al. | 325/18 |
| 3,292,085 | 12/1966 | Black | 325/18 |
| 3,441,854 | 4/1969 | Cole | 325/18 |
| 3,617,888 | 11/1971 | Hanus | 325/18 |
| 3,696,252 | 10/1972 | Chapman | 328/167 |

*Primary Examiner*—Albert J. Mayer
*Attorney, Agent, or Firm*—Donald B. Southard; James W. Gillman

[57] ABSTRACT

A combined encoder-decoder for use in two-way radio systems. The apparatus is operable in an encoder mode to provide tone oscillations during operation of the radio apparatus in the transmit mode and also in a decoder mode to provide a control signal in response to a received tone signal of a particular frequency during operation of the radio apparatus in the receive mode. The encoder-decoder includes a single active filter and a feedback circuit selectively coupled to the filter to form an oscillator for producing the tone oscillations in the encoder mode of operation. An input amplifier/limiter is enabled to apply received tone signals to the active filter during decoder operation. A control circuit responsive to operation of the radio apparatus is coupled to the feedback circuit and to the input circuit so as to selectively enable the feedback circuit during encoder operation and the input circuit during decoder operation. The control circuit causes the feedback circuit to provide increased gain upon initiation of encoder operation so that oscillations build up rapidly. The output of the active filter is applied to a detector to which two integration circuits are connected, the first being enabled during encoder operation and the second during decoder operation. The first integration circuit responds when the signal builds up to control the feedback circuit to reduce the gain to the desired level. The second integration circuit is enabled during decoder operation so that when the signal of a particular frequency is applied to the active filter a control signal is produced which is utilized to enable the audio circuit of the receiver. The control circuit also responds to the switching of the circuit between encoder and decoder modes of operation to increase the bandwidth of the active filter to prevent encoder tone overshoot during the receive-transmit transition and to prevent decoder falsing during the transmit-receive transition.

9 Claims, 4 Drawing Figures

COMBINED ENCODER-DECODER APPARATUS HAVING A SINGLE ACTIVE FILTER

BACKGROUND OF THE INVENTION

It has been common practice for many years to apply a tone signal with a voice transmission, which has a frequency associated with one or more receivers, so that only the receivers responsive to the particular frequency are operative to reproduce the voice transmission. Such a system is set forth and described in U.S. Pat. No. 2,918,571, issued Dec. 22, 1959 to Robert Peth, and assigned to the same assignee as the present application. The referenced prior art customarily utilize a vibrating reed device to establish the particular frequency transmitted, and a second vibrating reed device at the receiver to respond to the particular frequency transmitted. In order to conserve equipment, a single reed device has been used in a combined encoder-decoder device and such a system is described in U.S. Pat. No. 3,250,997, issued May 10, 1966 to William J. Cole and Robert H. Walker, and assigned to the same assignee as the present invention.

Although systems as are described in the above-referenced patents have been satisfactorily used for many years, such systems have the objection that they require a relatively large and expensive mechanical vibrating device. With the continuing trend toward reduction in size of electronic devices, and with the desire for elimination of mechanical devices, it has been proposed to use an active filter as the selective element to replace the vibrating reed devices previously used. It has been found, however, that various problems arise in connection with the use of an active filter in a combined encoder-decoder for use in the application which has been described. For example, in order to provide the high selectivity desired, the active filter must have a narrow bandwidth. This presents a problem in that substantial real time is required for the active filter oscillator to build up oscillations to the desired level. Another problem is that when the device is operating as an encoder producing oscillations, substantial energy is stored in the active filter and when the device is switched to decoder operation the energy remaining in the filter may produce a control signal, thereby falsely indicating that a signal of the desired frequency is received. Similarly, substantial energy remains in the filter when it is operating in the decoder mode, such that when the system is connected to operate as an encoder at the same frequency, the stored energy together with the energy building up in the oscillator circuit may cause overshoot.

SUMMARY OF THE INVENTION

Accordingly, it is an object of the present invention to provide an improved encoder-decoder arrangement for use in conjunction with two-way radio apparatus wherein an active filter is used to control the frequency of tone oscillations produced during encoder operation, and to select a received tone signal of a particular frequency to provide a control signal during decoder operation.

A further and more particular object of the present invention is to provide a combined encoder-decoder which includes a single active filter device and a feedback circuit coupled thereto so as to provide suitable oscillations wherein the gain of the referenced feedback circuit is selectively controllable to produce high gain for rapid build-up of oscillations, and lower gain after the oscillations build up.

Still another object of the present invention is to provide a combined encoder-decoder arrangement of the foregoing type wherein the bandwidth of an included active filter can be selectively increased in switching to either encoder or decoder mode, so that the energy stored in the active filter is removed and can not adversely effect the operation in the new mode.

DETAILED DESCRIPTION

Figure 1:
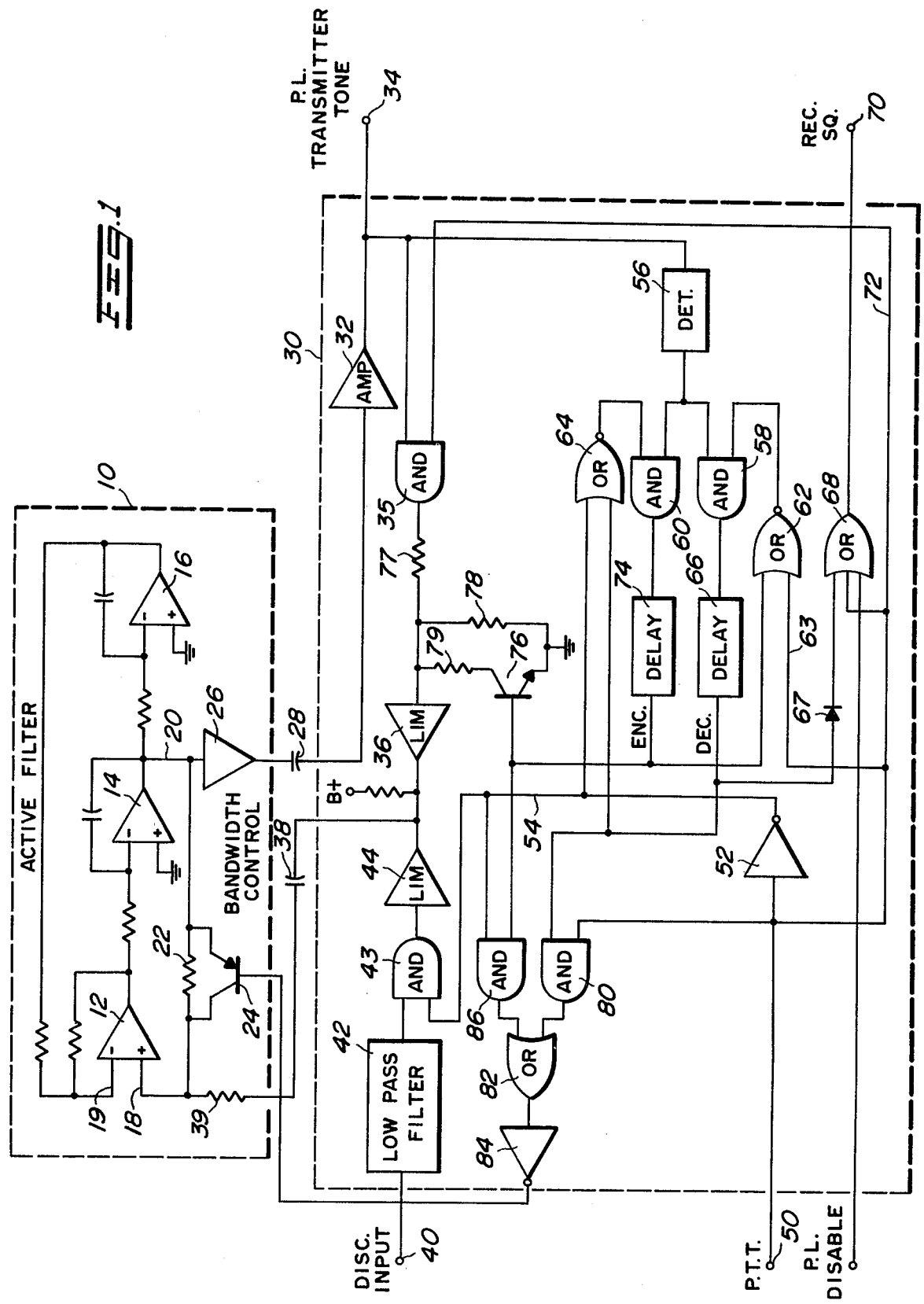
FIG. 1 is a block diagram of an encoder-decoder arrangement which has been constructed in accordance with the invention.

As shown in FIG. 1, the encoder-decoder arrangement of the present invention includes an active filter circuit 10 which is formed by operational amplifiers 12, 14 and 16 and the interconnections therebetween. The active filter circuit can be of the type described in U.S. Pat. No. 3,696,252 which issued Oct. 3, 1972 to Ronald H. Chapman, and assigned to the same assignee as the present invention. The filter 10 is responsive to an input applied to a lead 18, connected to one input of the operational amplifier 12 which in turn produces an output on a lead 20 connected to the output of amplifier 14. Amplifier 16 is in a feedback loop to the second input 19 of the amplifier 12. A resistor 22 is coupled between the ouput lead 20 and the input lead 18 of the active filter, and has a selected value to provide the desired bandwidth. A transistor 24 is included which has its emitter-collector path connected across the resistor 22, so that when transistor 24 is rendered conductive, the resistance between output lead 20 and input lead 18 is substantially reduced. As will be readily appreciated, this effectively damps the active filter so as to increase its effective bandwidth.

Connected to the active filter circuit 10 is a signal processing circuit 30 serving as control circuit means which cooperates with the active filter circuit to provide the combined encoder-decoder system. Both the active filter circuit 10 and the processing circuit 30 may be provided as hybrid modules. The components of the circuits 10 and 30 may be provided by integrated circuits of known construction.

The output lead 20 of the active filter circuit 10 is coupled through a buffer limiter stage 26 and a capacitor 28 to an amplifier 32 of the processing unit 30. The output of the amplifier 32 is connected to an output terminal 34, which may apply the "PL" transmitter tone oscillation signal to the modulator of a radio transmitter with which the device is intended to be used. "PL" in this instance refers to "Private Line" tone coded signaling, the operation of which in two-way communication systems is well understood by those skilled in the art such that further description is not necessary. A more detailed description may be found in the U.S. Pat. No. 2,918,571 referred to hereinbefore. The output of amplifier 32 is also applied thorugh an AND gate 35 to limiter 36 which holds the level of the signal below a fixed value. The output of limiter 36 is applied through a capacitor 38 and a resistor 39 to the input lead 18 of the active filter. The circuit through amplifier 32 and limiter 36 provides feedback about the active filter for sustaining oscillations.

Signals generated by the discriminator (not shown) of the associated receiver with which the decoder is used are applied from terminal 40 to low pass filter 42. Appropriate tone signals are then selected by low pass filter 42 and applied through an AND gate 43 to limiter stage 44, the output of which is also connected through capacitor 38 and resistor 39 to the input lead 18. Accordingly, in this manner, received tone signals are applied to the active filter 10 during operation in the decoder mode.

The signal processing circuit 30 operates in the encoder and decoder modes in accordance with the push-to-talk signal as applied at the terminal identified at 50. The radio transmitter-receiver apparatus (not shown) with which the encoder-decoder is used is normally in condition to receive, and operates to transmit when the associated push-to-talk (PTT) switch (not shown) is operated. Circuit 30 normally operates as a decoder, and when the PTT switch is operated, a potential is applied to terminal 50 so as to condition the circuit for encoder operation. In the absence of the potential at terminal 50, however, the inverter 52 connected to terminal 50 provides an enabling potential on conductor 54 which is connected to the AND gate 43, so that the AND gate 43 will be effective to pass the signal from the low pass filter 42. The received signal will be applied through limiter 44 to the active filter 10, which will then select a particular tone frequency and when the particular tone is present it will be applied from the filter 10 through amplifier 32 to the tone detector 56.

Tone detector 56 feeds AND gates 58 and 60, which have second inputs from OR gates 62 and 64, respectively. These OR gates effect a signal inverting function and thus provide an output when no input signal is applied thereto. During reception when there is no potential applied to PTT terminal 50, no potential is applied to input 63 of OR gate 62, so that the inverted output to the AND gate 58 enables the same, and the output of detector 56 is applied therethrough to integrator delay circuit 66. The output of the delay circuit 66 is then applied through diode 67 to one input of OR gate 68, the output of which is connected to the receiver squelch terminal 70. This controls the audio section of the receiver with which the encoder-decoder is used, and will enable the audio sections so that the signal being transmitted is reproduced.

When the transceiver PTT switch is operated, the potential from PTT terminal 50 will be applied to inverter 52 which removes the potential on conductor 54 so that the AND gate 43 is disabled. Accordingly, the discriminator output present at terminal 40 is no longer applied to the active filter 10 at input 18. At the same time, the potential from terminal 50 will be directly applied to conductor 63 to provide an input to OR gate 62 so that the inverted output therefrom will be removed and the AND gate 58 will likewise be disabled. Further, the input from terminal 50 is also supplied through conductor 72 to the AND gate 35 to enable the same, so that the output of the active filter 10 is applied through gate 35, through the limiter 36, and back to the input of the active filter to form an oscillator. When the oscillator output reaches a predetermined level, the detector 56 will apply a signal to the AND gates 58 and 60. As previously described, the AND gate 58 has been disabled, but the removal of the potential on conductor 54 when the push-to-talk potential is applied will remove the input from OR gate 64, so that the inverting output therefrom is applied to the AND gate 60. This will enable AND gate 60 so that the detector voltage is applied therethrough to the integrator delay circuit 74.

The potential from circuit 74 is applied to transistor 76 to render the same conducting so as to control the gain of the signal applied from AND gate 35 to limiter 36 in the oscillator feedback circuit. The output of the AND gate 35 is normally applied to the input of the limiter 36 through the voltage divider formed by resistors 77 and 78. When transistor 76 conducts, the resistor 79 will be connected in parallel with resistor 78 to reduce the portion of the signal applied to the limiter 36. This acts to cut down the level of oscillations after they have built up to a predetermined value. The gain is boosted when encoder operation is initiated until the signal builds up to the desired level, and then the delay circuit 74 acts to turn on transistor 76 and cut down the gain.

The transistor 24 of the bandwidth control circuit of the active filter 10 is controlled from the outputs of the delay circuits 66 and 74 to which the detector output is applied during decoder and encoder operation, respectively. The output of delay circuit 66 is applied to AND gate 80, which is enabled during encoder operation by the potential applied to terminal 50. The output of AND gate 80 is applied through OR gate 82 and through inverter 84 to the base of transistor 24. When a signal is present at the output of delay circuit 66, and the transceiver PTT switch is operated to enable the AND gate 80, a potential is applied through the AND gate 80, OR gate 82 and inverter 84 to turn on the transistor 24 to increase the bandwidth of the active filter 10. This acts to dissipate the energy which has been stored in the active filter.

Similarly, when the PTT potential is removed from terminal 50 at the end of a transmission, so that the inverter 52 applies a potential to conductor 54, the AND gate 86 will be enabled which applies the output signal from delay unit 74 therethrough and through the OR gate 82 and the inverter 84. Therefore, at the end of the transmission the AND gate 86 will be enabled to turn on the transistor 24 to increase the bandwidth of the active filter to dissipate the energy therein. The active filter 10 will then be conditioned for further use, either in the encoder or decoder modes.

The outputs of the decoder delay circuits 66 and 74 are connected to OR gates 64 and 62, respectively, to disable the inputs to the delay circuit so that inputs cannot be applied to both circuits simultaneously. That is, during decoder operation the output of the delay circuit 66 is applied to OR gate 64 to remove the inverting output therefrom, so that the AND gate 60 is disabled and the output of detector 56 cannot be applied to the delay circuit 74. Similarly, during encoding operation the output of delay circuit 74 is applied to the OR gate 62 to remove the inverting output therefrom and disable AND gate 58, so that the detector output is not applied to the delay circuit 66.

Figure 2:
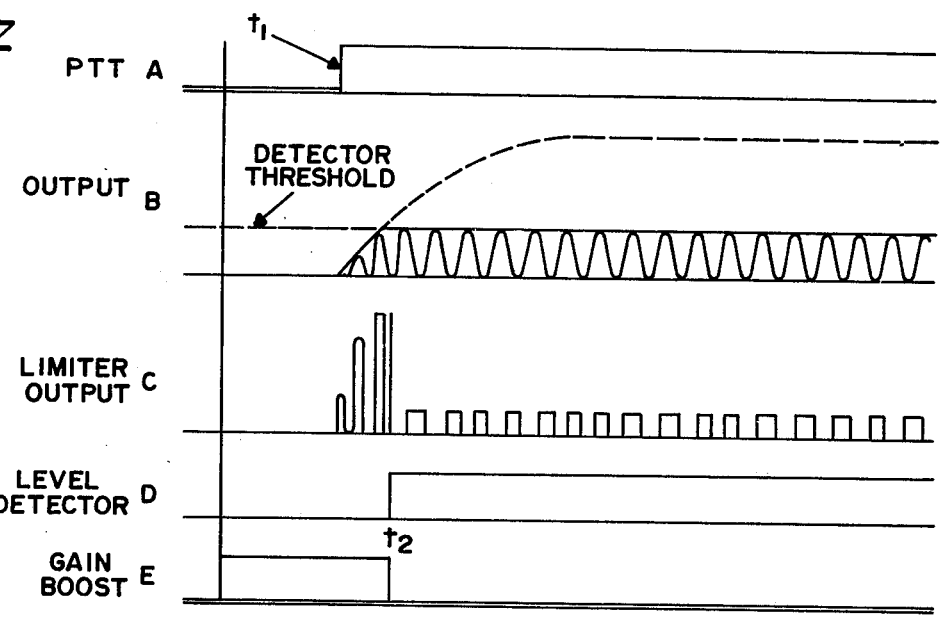
FIG. 2 is a chart illustrating the operation of the feedback circuit so as to provide for rapid build-up of oscillations.

The operation of the gain boost circuit is indicated by FIG. 2, wherein line A illustrates the operation of the transceiver push-to-talk (PTT) switch, which is operated at time $t_1$ to enable the AND gate 35 so that the feedback circuit through limiter 36 is completed and oscillations start. Line B shows the output of the oscillator, and shows the build up of the amplitude thereof to a threshold level. Line C shows the limiter output, which initially operates in a high gain state to rapidly increase the amplitude with each cycle. When the oscillator output (line B) reaches the threshold, the detector 56 provides an output at time $t_2$, as shown by line D. This turns on the transistor 76 to remove the gain boost (line E) so that the limiter output falls to a lower steady state value. This causes the oscillator output on line B to remain substantially constant at the threshold value.

Figure 3:
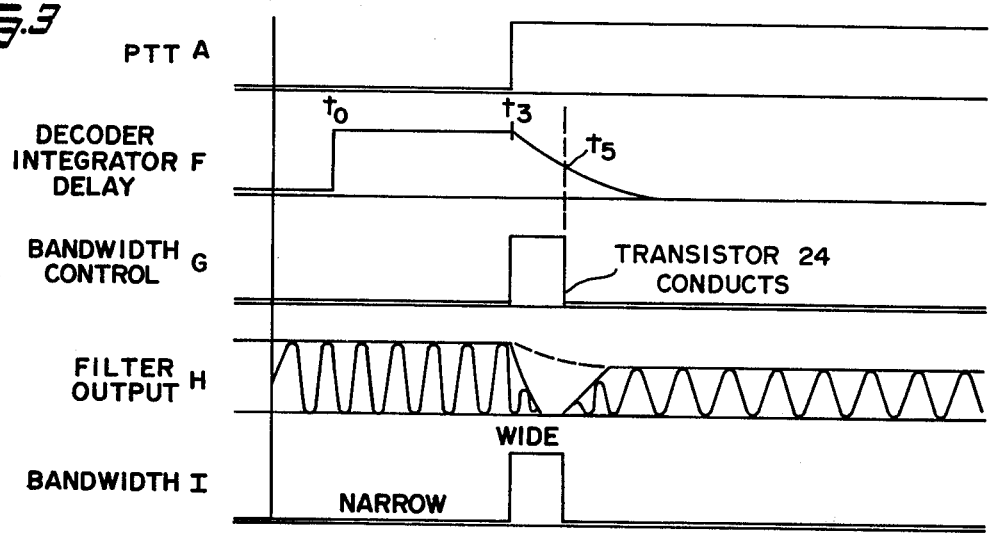
FIG. 3 is a chart illustrating the increase in bandwidth at the initiation of encoder operation.

FIG. 3 shows the operation of the circuit to change the bandwidth of the filter when the PTT switch is operated to initiate a transmission. Line F shows that the decoder delay circuit 66 provides an output at time $t_0$ when the tone has been detected. Then when the PTT switch operates at time $t_3$, the output of the delay circuit 66 acts in combination with the push-to-talk potential at terminal 50 to operate AND gate 80 to apply potential through OR gate 82, and this is inverted by inverter 84 to turn on transistor 24. The transistor turns on at time $t_3$ as shown by line G to increase the bandwidth for a period of time until the output of the delay circuit 66 drops below a given level, such as that at time $t_5$, as shown by line F in FIG. 3. Line H is representative of the output of the active filter 10 while line I indicates the change in bandwidth.

Figure 4:
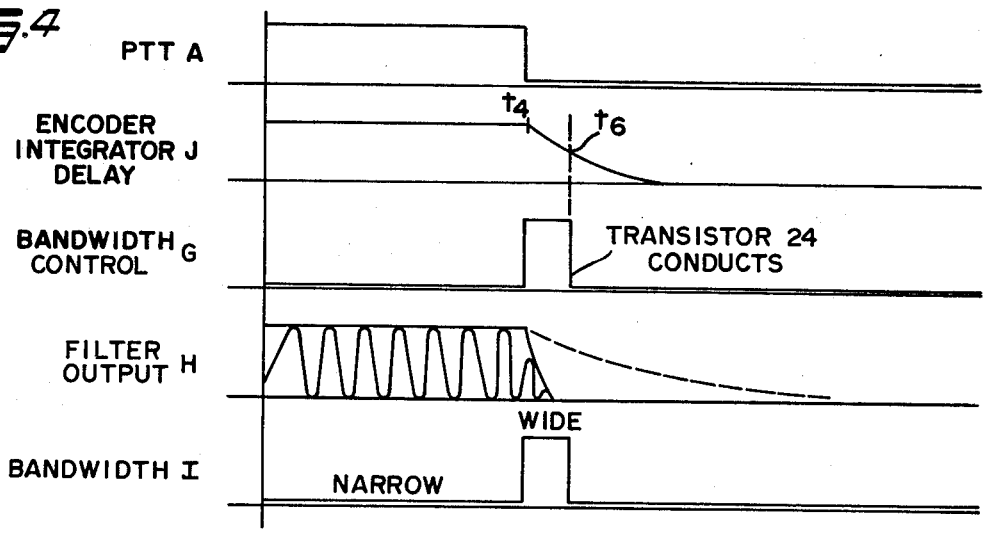
FIG. 4 is a chart illustrating the increase in bandwidth at the initiation of decoder operation.

FIG. 4 shows the operation of the circuit at the end of a transmission when the push-to-talk switch is released at time $t_4$. The encoder delay circuit 64 will provide an output for a time, as indicated by line J, which will be applied to the AND gate 86. When the inverted push-to-talk potential enables the AND gate 86, the potential is applied through gate 86, OR gate 82 and inverter 84. Inverter 84 applies a potential to transistor 24 to render the same conducting to increase the bandwidth so that the energy in the filter 10 is dissipated, as indicated graphically by line H. When the potential from the delay circuit 74 decreases below a given level, such as that at time $t_6$, the signal is removed and transistor 76 turns off. This is shown by line G in FIG. 4. This causes the bandwidth to be wide for the period between $t_4$ and $t_6$ (line I) and then to become narrow again so that the active filter 10 is in condition to operate in either decoder or encoder modes.

While a particular embodiment of the present invention has been set forth and described herein, it is to be understood that various alternative constructions and modifications may be effected without departing from the true scope and spirit of the invention. Accordingly, the appended claims are intended to cover all such alternative constructions and modifications that fall within the true scope and spirit of the present invention.

What is claimed is:

1. Combined encoder-decoder apparatus for use in two-way radio equipment having a transmitter and receiver and operable in an encoder mode for providing tone oscillations during operation of the radio transmitter, and in a decoder mode for providing a control signal in response to a received tone signal of a particular frequency during operation of the radio receiver, such apparatus including in combination:
    active filter means with an input, output, and a control terminal responsive to an applied potential to increase the bandwidth of said active filter means;
    feedback means interconnecting said input and said output of said active filter means for producing tone oscillations;
    input means coupled to said active filter input for applying received tone signals thereto; and
    control circuit means coupled to said active filter means and responsive to the operation of the radio transmitter for enabling said feedback means to operate said apparatus in encoder mode and produce tone oscillations, and further responsive to the operation of the radio receiver for enabling said input means to pass tone signals and operate said apparatus in decoder mode and produce a control signal,
    said control means further applying a predetermined potential to said active filter control terminal during transition of the radio equipment between said different modes to momentarily increase the bandwidth of said active filter means whereby stored energy present therein may be rapidly dissipated.

2. Combined encoder-decoder apparatus in accordance with claim 1 wherein said control means includes a detector coupled to said active filter output, and means coupled to said detector and responsive thereto during decoder mode operation to provide a control signal upon the occurrence of a tone signal of a predetermined amplitude and time duration.

3. Combined encoder-decoder apparatus in accordance with claim 1 wherein said control means includes a detector coupled to said active filter output for providing a d-c voltage in accordance with the amplitude of the tone signal at said active filter output, and first and second integration circuits connected to said detector, each integration circuit being operative to produce a control signal upon detector voltage reaching a predetermined level for a given time duration, and means for selectively enabling said first and second integration circuits for respective encoder and decoder mode operation.

4. Combined encoder-decoder apparatus in accordance with claim 3 wherein said control means includes means responsive to said control signals from said first and second integrator circuits for controlling the potential applied by said control means to said active filter control terminal, with a control signal indicating operation in one of the encoder and decoder modes of operation causing said potential to change so that the bandwidth of said active filter means is reduced.

5. Combined encoder-decoder apparatus for use in two-way radio equipment having a transmitter and receiver and operable in an encoder mode for providing tone oscillations during operation of the radio transmitter, and in a decoder mode for providing a control signal in response to a received tone signal of a particular frequency during operation of the radio receiver, such apparatus including in combination:
    active filter means with input and output;
    feedback means interconnecting said input and said output of said active filter means for producing tone oscillations, said feedback means further including bandwidth control means which when actuated is effective to increase the bandwidth of said active filter means to a predetermined amount;
    input means coupled to said active filter input for applying received tone signals thereto;
    gain control means for causing said tone oscillations produced by said active filter means during encoder mode operation to initially occur at a boosted gain rate until reaching a predetermined level and thereafter reducing and maintaining said tone oscillations at a given lower gain level; and control circuit means coupled to said active filter means and responsive to the operation of the radio transmitter for selectively enabling said feedback means whereby said active filter means produces tone oscillations for encoder mode operation, and further responsive to the operation of the radio receiver for enabling said input means to pass tone signals for decoder mode operation, said control means further including means for actuating said bandwidth control means for a predetermined time duration whenever said active filter is caused to change operating modes whereby stored energy present in said active filter means may be rapidly dissipated.

6. Combined encoder-decoder apparatus in accordance with claim 5 wherein said active filter means comprises at least a pair of serially connected operational amplifiers.

7. Combined encoder-decoder apparatus in accordance with claim 6 wherein said bandwidth control means includes a resistance interposed in said feedback means of said active filter and which further includes a transistor device having its emitter-collector circuit in parallel with said resistance.

8. Combined encoder-decoder apparatus in accordance with claim 5 wherein said gain control means includes a controllable amplifier in said feedback means having variable impedance means in the output circuit thereof which when actuated is effective to reduce the gain of said controllable amplifier a predetermined amount, said control means further including means for actuating said variable impedance element comprising detector means for receiving tone oscillations, and integrator delay means interposed between said detector means and said variable impedance means.

9. Combined encoder-decoder apparatus in accordance with claim 8 wherein said variable impedance means includes a resistance element in parallel with the emitter-collector circuit of a transistor device, the base thereof being coupled to the output of said integrator/delay circuit means.

* * * * *